July 20, 1965  W. E. MARTIN  3,195,248
SCRAPER EQUIPMENT ATTACHABLE FOR BODILY MOVEMENT
Filed Aug. 2, 1962  2 Sheets-Sheet 1

INVENTOR:
William E. Martin
BY
Eberhard E. Wettley
Atty.

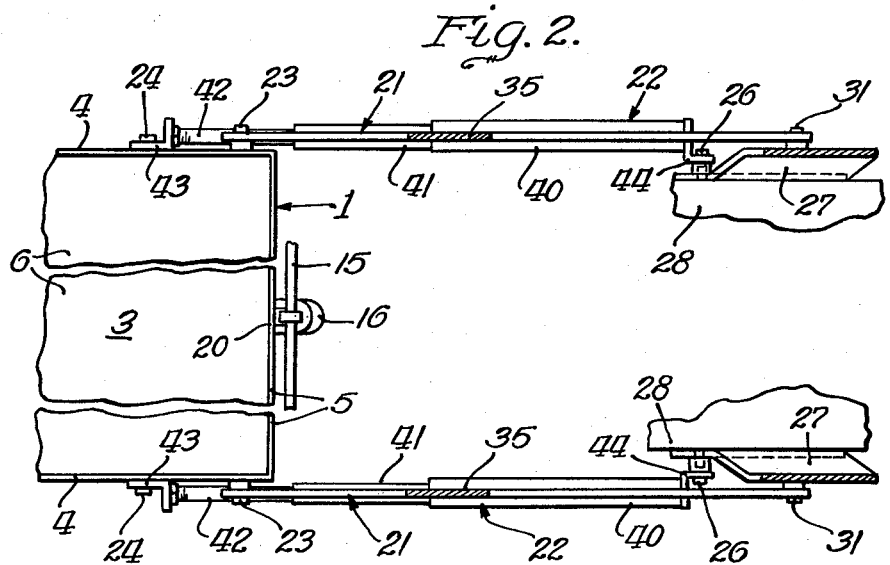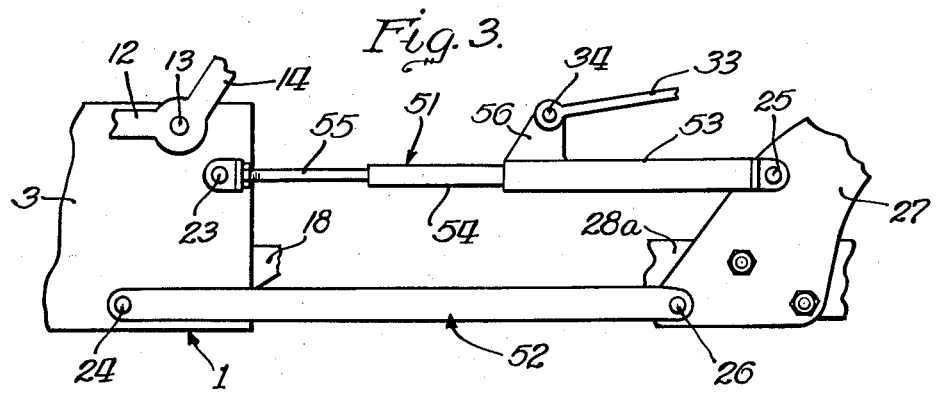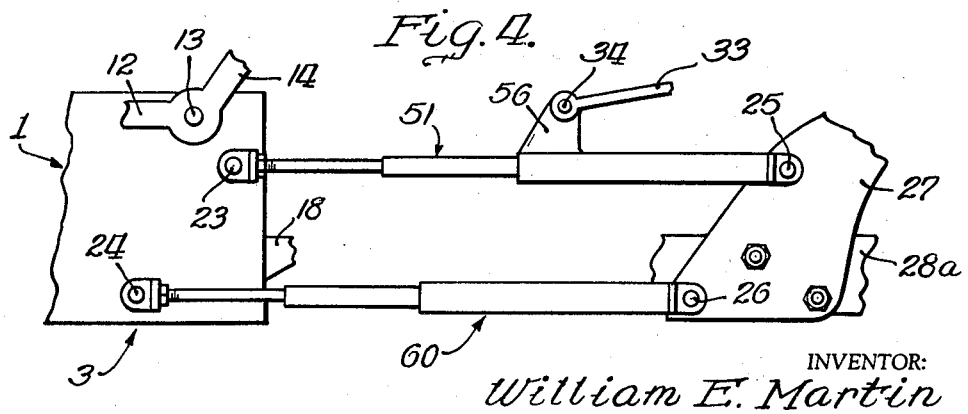

United States Patent Office 3,195,248
Patented July 20, 1965

3,195,248
SCRAPER EQUIPMENT ATTACHABLE FOR
BODILY MOVEMENT
William E. Martin, P.O. Box 187, Kewanee, Ill.
Filed Aug. 2, 1962, Ser. No. 214,380
3 Claims. (Cl. 37—124)

This invention generally relates to earth moving equipment.

More particularly the invention is directed to a scraper equipped with cooperative supporting and manipulating mechanisms that are conveniently arranged and devised for attachment with a conventional power driven vehicle normally adapted for other uses.

Thus the scraper and associated mechanisms may be readily connected with a power vehicle such as a crawler tractor, for example, to thereby convert a vehicle of that type into a composite working assembly adapted for leveling work, for general surface area maintenance, to cut irrigation ditches, to engage in terracing, to build roads, to clean up on construction sites and to perform many analogous functions or services.

One of the objects of this invention is to provide a complete assembly comprising a scraper together with supporting structure and operating mechanism which will permit easy attachment or securement with a power vehicle to convert the latter into a vehicular unit for full scraper operation and function with all the power being supplied by the power vehicle to move the equipment and to operate the scraper.

Another object is to provide a link structure to support the scraper which includes mechanism to control the scraper bowl or bucket in relation to the associated power vehicle.

A still further object is to provide a link structure that will control the scraper bowl or bucket for bodily movement with respect to the power vehicle and which structure includes means to also tilt the bowl or bucket at various elevated positions in relation to the power vehicle for dumping the load or spreading such load, if desired, depending on conditions surrounding the use of the scraper.

Other objects and advantages relating to the scraper assembly of the present invention shall hereinafter appear in or become apparent from the following detailed description having reference to the accompanying drawings forming a part of this specification.

In the drawings:

FIG. 2 is a detailed plan view of the link means connecting the scraper bowl with attachment brackets secured to the power vehicle, certain parts being shown in section and certain structure being omitted to better show the invention;

FIG. 3 is a fragmentary side elevational view of a modified arrangement of link means for the scraper bowl control and operation; and FIG. 4 is another fragmentary side elevational view like FIG. 3 to illustrate a further modified arrangement of link means for the bowl operation in relation to the power vehicle.

Figure 1:
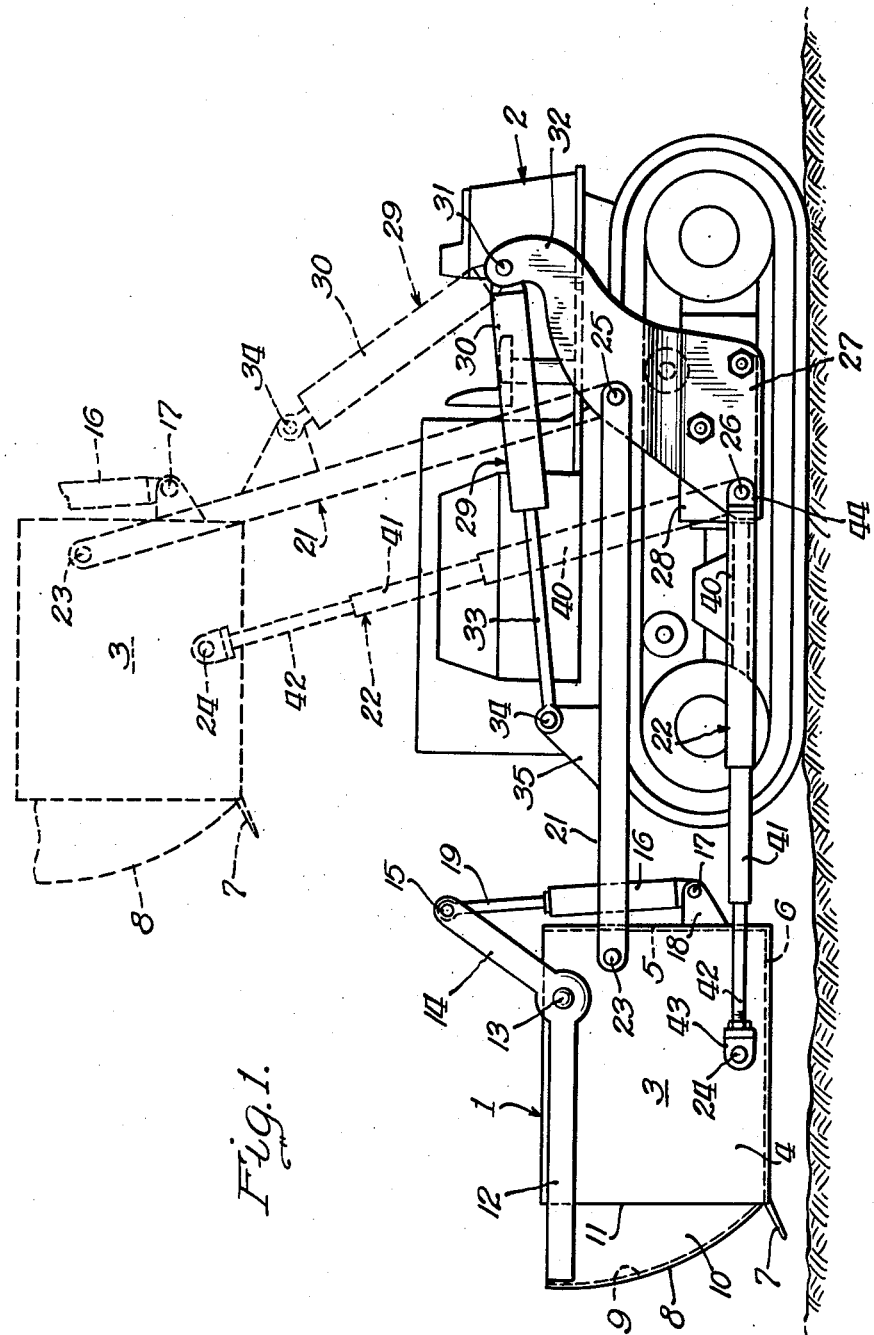
FIG. 1 is a diagrammatic side elevational view of the scraper assembly of this invention as the same generally appears when attached to a power vehicle for operation and manipulation by such a vehicle.

It should be understood that power vehicles of the kind to which the scraper assembly of this invention is releasably connected are equipped with hydraulic power systems with which it is possible to supply and operate the power means of the scraper apparatus. This may be done directly in some cases or by auxiliary hose and valve arrangements for the control of the power mechanisms associated with the scraper attachment. Broadly, power vehicles are here represented by a crawler tractor.

In FIG. 1, the arrangement shown illustrates an operatively attached scraper 1 connected with a power vehicle 2 and being subject to the manipulations of the vehicle as to course and direction.

The scraper 1 is symmetrical side for side so that the same general mechanisms appear on opposite sides of the scraper including similar connections with the far side of the power vehicle 2 which power vehicle 2 is power driven by wheel means as a crawler tractor.

Scraper 1 comprises a material carrying bowl or bucket 3 having sides 4, back 5 and a bottom 6 provided with a cutting blade 7. An apron 8 is provided having a curved terminus front wall 9 with side wings 10 to enclose the open front 11 of the bowl 3 and to retain the bowl load including some excess or spill over load as well.

Apron 8 has side arms 12, pivoted on stub shafts or pins 13 mounted on the bowl sides 4, with arms 12 terminating in operating arms 14 disposed for connection with a cross rod or pin 15 providing a part of a hydraulic actuating means. In the illustration in FIGS. 1 and 2, a hydraulic cylinder 16 is pivoted on a pin 17 carried by a bracket 18 on wall 5 of bowl 3 and the ram 19 of the cylinder is pivotally joined with the pin or rod 15 centrally of the bowl at 20 to actuate the operating arms 14 of the apron 8.

Thus the bowl 3 and its apron 8 are made as a unit to cooperate in their designed capacities in any position that the bowl may assume during the manipulation thereof in carrying out its intended purpose.

The mechanism employed to manipulate the bowl 3 comprises pairs of links 21 and 22 connected with pivot pins 23 and 24 secured to the sides 4 of the bowl in vertical separated positions also spaced in the fore and aft positions as shown in FIG. 1.

The rear ends of the links 21 and 22 are mounted on pins 25 and 26 secured to brackets 27, the pins 23–24 and 25–26 forming a parallelogram arrangement to dispose the links 21 and 22 in parallel condition as they move about their respective pivot pins. The foregoing is the preferred link arrangement although the invention need not necessarily be strictly limited to that specific concept. Under certain conditions of operation, it may become feasible to vary the exact locations of the pivot pins 23–24 and 25–26 to introduce a prearranged tilt of the bowl 3 upon the swinging of the links 21–22.

Brackets 27 are suitably rigidly attached to the frame 28 of the power vehicle 2 to form the primary supporting means for the bowl operating means and the sole guiding means for steering and guiding the bowl 3 with the vehicle. Frame 28 may comprise the frame or a frame part of any power vehicle, the vehicle shown in FIG. 1, by example, providing a track frame 28 on a crawler tractor such as diagrammatically shown at 2.

Supplementing the bracket and link means is the power means 29 that furnishes the actuating instrumentality for the vertical control of the bowl 3 in carrying out the functions thereof. Power means 29 comprises a hydraulic cylinder 30 pivoted on pin 31 mounted on an extension 32 of bracket 27, the cylinder having a ram 33 connected with pin 34 mounted on a suitable link bracket 35 secured to link 21 in a feasible manner. Operation of the cylinder 30 will cause links 21 and 22 to swing on their respective bracket pins 25–26 to raise or lower bowl 3 as needed, the bowl maintaining its position with respect to the ground or to the crawler tractor when the link means conforms with the parallelogram arrangement shown in FIG. 1.

From the previous description, it will be apparent that the power vehicle 2 provides the means for maneuvering the scraper assembly as to direction and course, while the hydraulic cylinder 30 acts to raise or lower the scraper assembly according to the operator's dictates to carry out certain of the earth handling functions attendant a device of the character noted.

One of the other necessary functions of the scraper is the dumping operation requiring the tilt of the scraper bowl to discharge the load from the open bowl front 11 and in amounts that can be regulated by the position of apron 8. The dumping action is brought about by providing at least one of the links 21 or 22 as an extensible member which can be power operated to lengthen or shorten the overall length of that link to swing the bowl about one link pin as the other pin describes an arc about such one pin to tilt or rock the bowl 3 in a direction to bring the bowl front 11 into a load discharging position when desired. With this arrangement, it is possible to rock or tilt the bowl upon a lateral axis to cause the bowl bottom 6 to assume different angular positions in relation to the general plane of the surface being worked upon by this scraper-crawler unit.

Bottom 6 of the bowl can be angled upwardly toward the front or angled upwardly rearwardly thereby relatively dropping the blade end 7, or the entire bowl can be swung into a position for a complete load discharge. Further, by a regulated use of the apron 8 to change the amount of bowl front opening, it is possible to spread the load as needed or desired. The bowl filling act may also be carried out under restricted bowl front access with the apron 8 adjusted vertically to suit the conditions of operation, etc.

Link 22 is constructed as a telescoping hydraulic cylinder in FIG. 1 to illustrate one way in which the dumping and tilting of the bowl can be regulated as needed. Link 22, therefore, comprises a plurality of telescoping cylinders such as 40 and 41, including a ram such as 42 providing a suggested terminal member. Cylinder 40 and ram 42 are each made with bearing ends 43 and 44 to journal upon the previously described pins 24 and 26, on the bowl 3 and bracket 27, respectively.

By raising apron 8 with the bowl 3 disposed in a desired elevated position and by retracting the telescoping cylinder means comprising links 22, the bowl will tilt downwardly in counterclockwise direction about pin 23 and the end of link 21 to discharge the material from within the bowl out of its open front 11. Expansion of link 22 will cause clockwise rotation of the bowl into a horizontal position or into any selected angular position for any desired purpose.

An alternative link arangement is generally illustrated in FIG. 3 wherein links 51 and 52 connect the bowl 3 with bracket 27 mounted upon the frame section 28a of a scraper manipulating vehicle which may or may not necessarily be a power vehicle. Link 51 is an expansible and retractible link in the form of a telescoping hydraulic cylinder comprising cylinders 53 and 54 with a terminal end ram 55. And link 52 is a fixed link placing the link means in reverse order with respect to each other from the form of the invention shown in FIG. 1.

The control cylinder 30 has its ram 33 connected through pin 34 with a bracket 56 secured to cylinder 53 and both links 51 and 52 are manipulated by cylinder 30 through the bowl and bracket connections of the links.

FIG. 4 is substantially like FIG. 3 except that link 52 is replaced with an expansible and retractible telescoping cylinder 60 so that a still greater flexibility of operation is possible for the controlled manipulation of the scraper bowl 3. Such link means can tilt the bowl or cant the same according to the manner of link operation as selected. In all cases where the expansible links are provided, it should be understood that the lengths of these links may be expanded by introduction of the hydraulic fluid and retracted by withdrawal of such fluid. Gauge markings may be supplied on the cylinder parts to provide reference means for an operator.

Attention is further directed to the dual links on each side of the bowl, spaced in lateral planes flanking the bowl sides, the same links extending outwardly beyond the bowl to flank their respective bracket means as well shown in FIGS. 1 and 2 to establish controlled stabilization for the bowl during its vertical movements. The operating mechanisms used to actuate the link means lie in the same general planes of the respective link means to maintain their power thrusts in the planes of operation of the link means for added stabilized control during bowl manipulation.

The foregoing description refers to the structures disclosed which are only used by way of example for demonstrating the inventive concept of the present invention. Certain changes and modifications are considered possible with respect to the exact combinations shown or in the various elements provided without departing from the basic idea. The extent of the modifications shall, however, be governed by the breadth and scope of the appended claimed subject matter.

What I claim is:

1. In a power operated material handling vehicle having ground engaging drive means having a median horizontal plane with portions of said vehicle frame disposed intermediate said drive means in the elevation of said plane, a scraper assembly comprising a scraper bowl movably mounted on said vehicle for actuation from an operative lowered ground engaging position ahead of the vehicle in line with said plane and into an inoperative raised position above said drive means, and power regulated link means at each side of the vehicle to mount said scraper assembly on said vehicle comprising individual upright brackets fixedly secured to the vehicle frame portions longitudinally intermediate said drive means and extending upwardly at opposite sides of the vehicle laterally beyond the outer sides of the drive means, each bracket having a set of link members pivotally connected therewith above and below said plane and having pivotal connections with the scraper bowl at points above and below said plane when said scraper bowl is lowered to operative position ahead of said drive means, and power operated means connected to actuate each set of link members to raise said scraper bowl between operative and inoperative positions, said power operated means each comprising a power cylinder pivotally connected with one of the fixedly secured brackets and having a ram pivotally connected with one of said link members on said bracket, said cylinder and ram extending substantially fore and aft in relation to the vehicle drive means and in upwardly flanking relation with respect to the link members operated thereby when said scraper bowl occupies its operative lowered position, said link members being subjected to compressive forces in positions above and below said plane when said scraper bowl is lowered to thus operatively and forcibly manipulate said scraper bowl in straight line fashion parallel with said plane to counteract vehicle tilt.

2. In the combination set forth and defined in claim 1 wherein each set of link members comprises parallel link members having their pivotal connecting points on their supporting bracket and on the scraper bowl arranged at the apexes of a parallelogram to maintain said bowl in a given angular relation with respect to the vehicle while being raised or lowered by their respective power operated means.

3. In the combination set forth and defined in claim 1 with the addition of providing one of the link members in each set as an extensible and retractable unit to cause fore and aft tilting of the bowl about the adjacent end of the other link member of said set for the control of the load in the bowl including the discharge function of dumping said load.

References Cited by the Examiner
UNITED STATES PATENTS

| | | | |
|---|---|---|---|
| 1,527,251 | 2/25 | Furst. | |
| 2,672,995 | 3/54 | Drott | 214—140 |
| 2,754,986 | 7/56 | Ferro | 214—140 |
| 2,820,555 | 1/58 | Lessmann | 214—140 |
| 2,932,101 | 4/60 | Ludowici | 37—117.5 |
| 2,952,084 | 9/60 | Dodge | 37—117.5 |
| 3,018,011 | 1/62 | Ackerman | 214—140 |
| 3,059,356 | 10/62 | Lorang | 37—144 |
| 3,057,496 | 10/62 | Garske | 214—140 |

FOREIGN PATENTS

| | | |
|---|---|---|
| 149,758 | 1/53 | Australia. |
| 1,124,133 | 6/56 | France. |
| 790,227 | 2/58 | Great Britain. |

BENJAMIN HERSH, *Primary Examiner.*
ROBERT C. RIORDON, *Examiner.*